Figure 1:
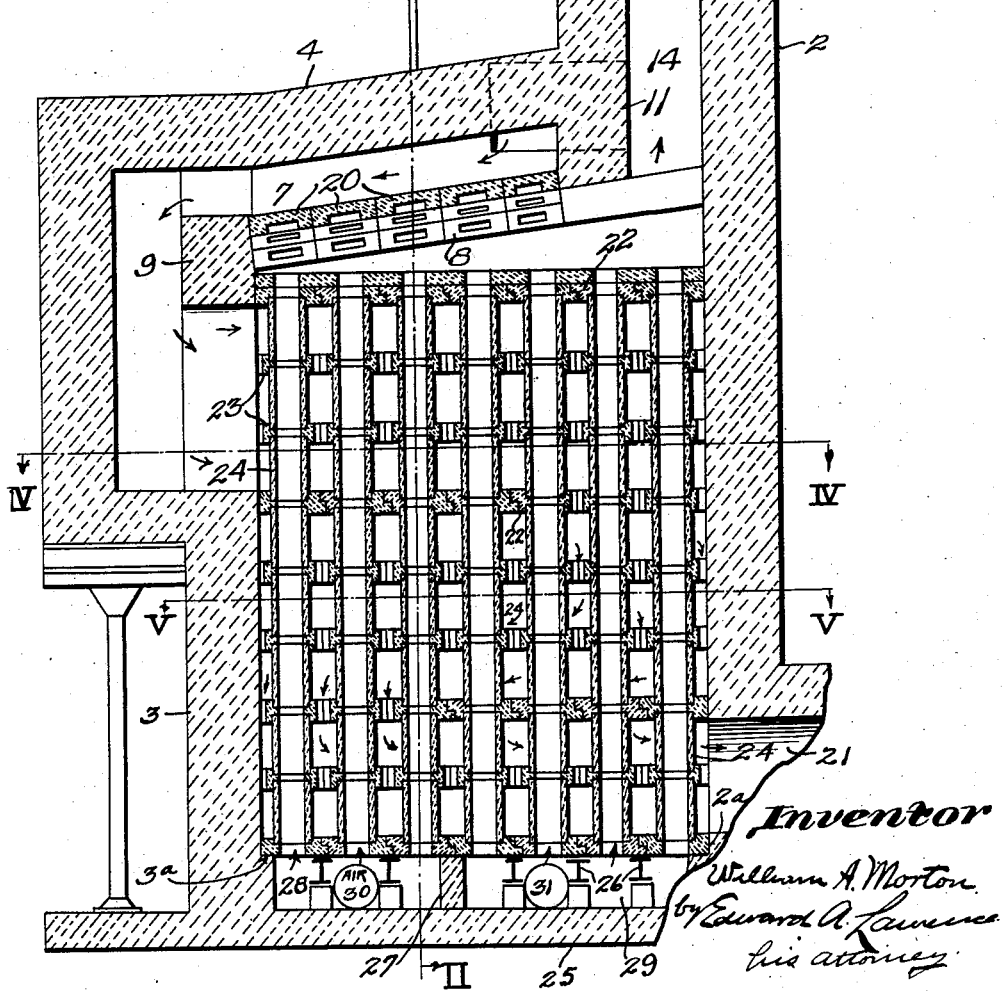

Dec. 13, 1927.

W. A. MORTON

RECUPERATOR

Filed May 21, 1926

1,652,210

3 Sheets-Sheet 1

Inventor
William A. Morton.
by Edward A. Lawrence
his attorney

Dec. 13, 1927.
W. A. MORTON
RECUPERATOR
Filed May 21, 1926   3 Sheets-Sheet 2
1,652,210
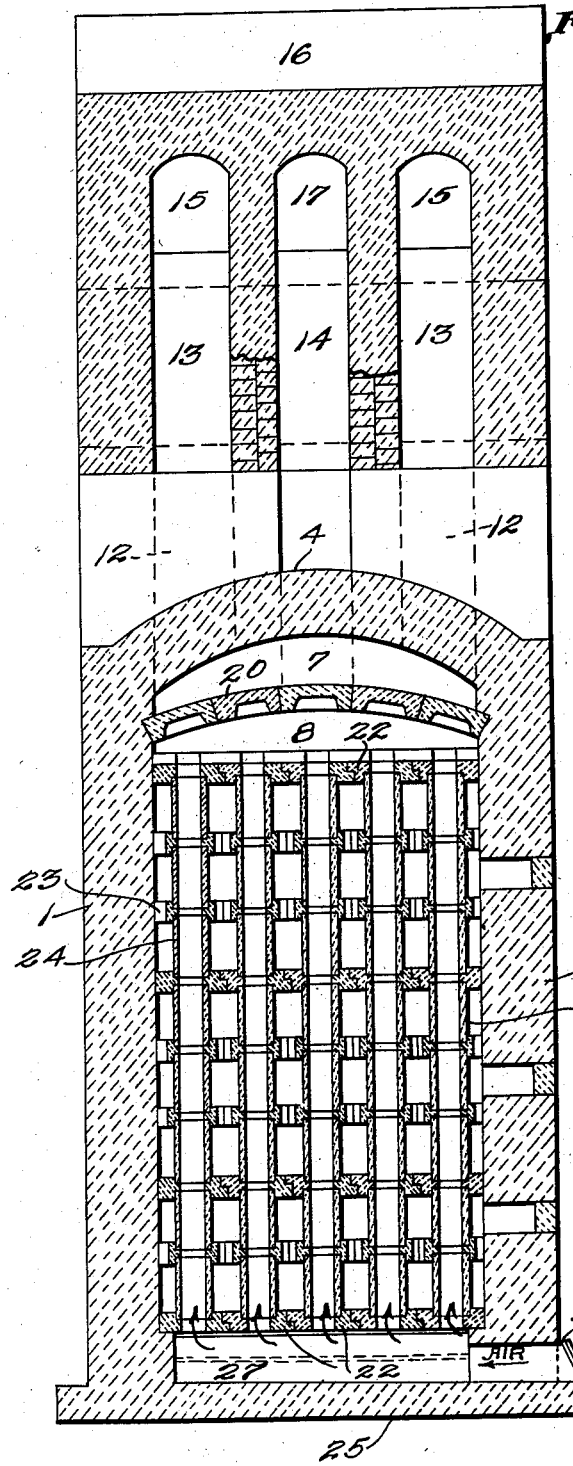
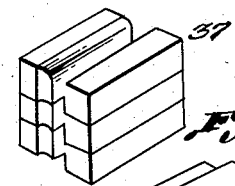
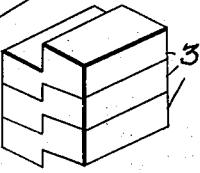
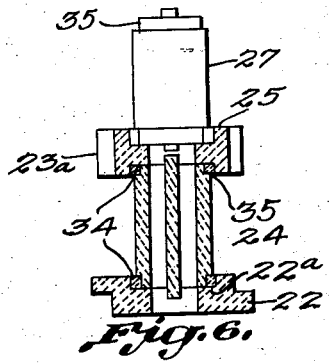
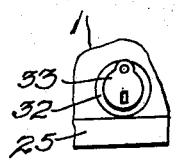
Inventor
William A. Morton,
by Edward A. Lawrence
his attorney.

Dec. 13, 1927.  
W. A. MORTON  
RECUPERATOR  
Filed May 21, 1926  
1,652,210  
3 Sheets-Sheet 3

Inventor
William A. Morton
by Edward A. Lawrence
his attorney

Patented Dec. 13, 1927.

1,652,210

UNITED STATES PATENT OFFICE.

WILLIAM A. MORTON, OF PITTSBURGH, PENNSYLVANIA, ASSIGNOR TO THE AMSLER-MORTON COMPANY, OF PITTSBURGH, PENNSYLVANIA, A CORPORATION OF PENNSYLVANIA.

RECUPERATOR.

Application filed May 21, 1926. Serial No. 110,776.

One of the objects which I have in view is the prevention of the burning out of the interior structure of the recuperator adjacent to the inlet of the waste furnace gases.

I accomplish this object by so controlling and proportioning the amount of air admitted to the recuperator so that a greater volume of air passes through the portion of the recuperator subjected to the highest temperatures.

I may also form the air flues against which the waste gases at their highest temperatures impact and which they surround of highly refractory material while the other air flues which are subjected to lower temperatures may be of material of higher conductivity, such for instance as cast iron.

I show novel means for accomplishing this object.

Another object which I have in view is the superheating of the preheated air during its travel from the recuperator and also the reduction of the temperatures of the waste gases, after they leave the furnace and before they enter the recuperator, below the refractory limit of the recuperator structure.

I accomplish this two-fold purpose by causing the waste gases, after they leave the furnace and before they enter the recuperator, to travel in conductive proximity with the preheated air during the latter's travel from the recuperator to the furnace.

By substituting this arrangement for the present practice of direct delivery of the preheated air from the recuperator to the furnace and the direct delivery of the waste gases from the furnace to the recuperator, I am enabled to reduce the temperatures of the waste gases to below the refractory limit of the recuperator without consequent thermal loss; for the preheated air is superheated by the heat of conduction from the waste gases.

For this two-fold purpose I provide a new and improved system of air and waste gases passages between the furnace and the recuperator.

Said passages are formed with relatively thin common partition walls of refractory material separating the air and waste gases passages, and I provide a new and improved construction for such walls which prevents leakage of air into the waste gases passages or the leakage of the waste gases into the air passages.

I also provide new and useful improvements in the recuperator flue structure whereby the joints between the flue tile and the flange tile or floor tile remain sealed.

Other new and useful improvements will appear from the following description.

Figure 3:
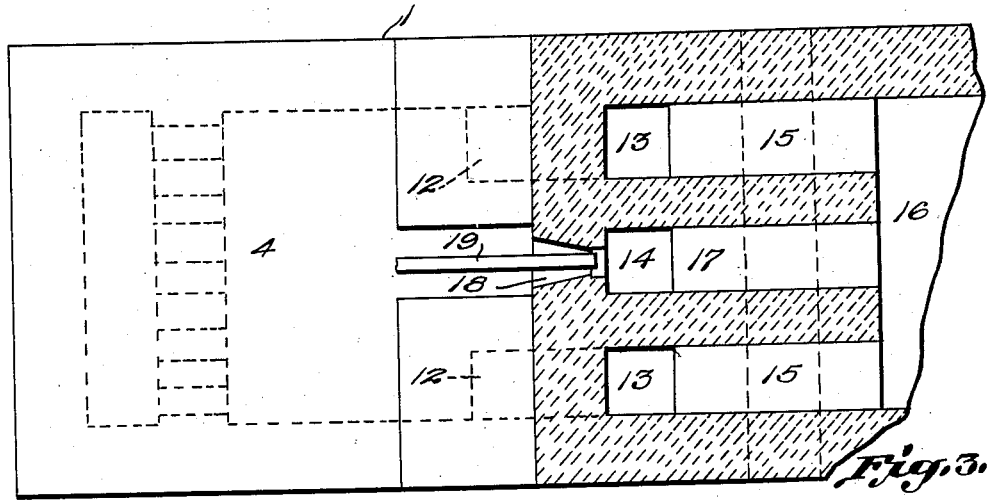
Figure 4:
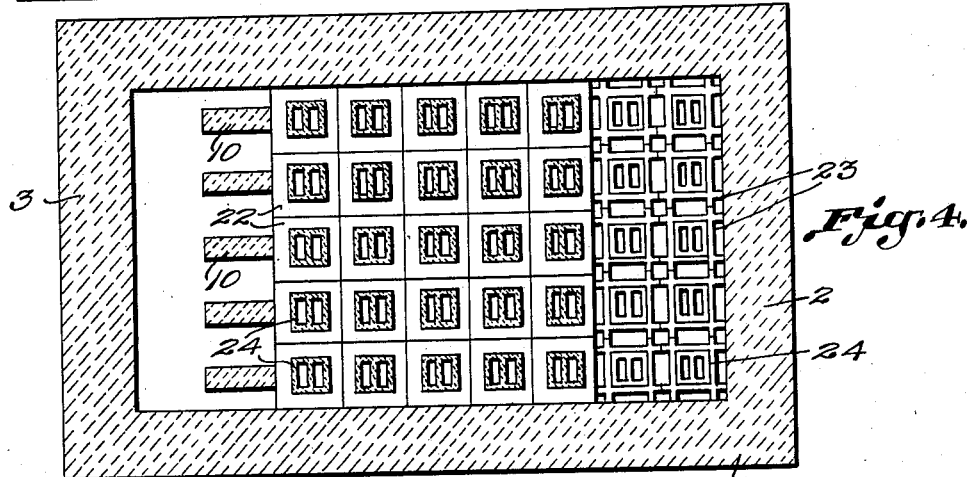
Figure 5:
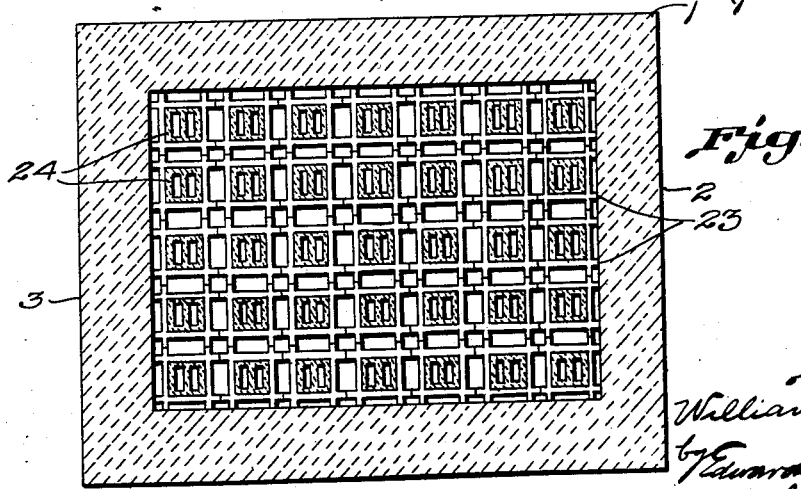

In the accompanying drawings, wherein I have illustrated the best embodiment of the principles of my invention now known to me, Fig. 1 is a vertical longitudinal section of the recuperator; Fig. 2 is a vertical section taken along the irregular line II—II in Fig. 1; Figs. 3, 4 and 5 are sectional views taken, respectively, along the lines III—III; IV—IV, and V—V in Fig. 1; Fig. 6 is an enlarged detail partially in vertical section showing assembled flue-tile, flange-tile and floor-tile and also showing my improved sealed joint; Figs. 7 and 8 are details in perspective showing modified construction of partition walls for the passages, and Fig. 9 is a detail looking from the right in Fig. 2 showing the one of the air admission valves.

Referring to the drawings, the recuperator structure hereinafter described, is inclosed by the side walls 1, the rear wall 2, the front wall 3 and the arched roof 4, the latter preferably inclining upwardly and rearwardly as shown in Fig. 1. The upper portion of the front wall is stepped forwardly as at 5 to provide the inlet chamber 6 which is open to the interior of the recuperator and also to the waste gases passage 7 whose top wall is the arched roof 4 and whose floor is formed by the false arch 8 springing from the side walls 1 and parallel with the roof 4. The front end of the false arch 8 merges into the arch 9 which separates the inlet and outlet of the chamber 6 and spans the space between the side walls 1. The arch 9 is supported from below by the spaced apart piers 10 between which the waste gases enter the interior of the recuperator.

The rear end of the passage 7 is closed by the arch 11 which supports the front wall of the waste gases and the preheated air flue later to be described.

12 represents a pair of angular passages connecting with the rear end of the passage 7 at its sides, and also connecting to the lower ends of the two down-flues 13 which have interposed between them the up-flue 14, the partitions being formed by relatively thin walls of refractory material which is later to be more fully described.

The upper ends of the down-flues 13 are connected to the front ends of the horizontal passages 15 communicating at their rear ends with the interior of the furnace 16, said passages 15 being separated by the horizontal combustion passage 17 whose rear end communicates with the furnace 16 and whose front end is provided with a port 18 through which extends the gas burner 19. The upper end of the up-flue 14 communicates with the front end of the passage 17.

The lower end of the up-flue 14 is open to the interior of the recuperator in the rear of the arch 11.

The false arch 8 is composed of arcuate refractory tiles 20 whose bodies are relatively thin while their perimetral edges are thickened, as shown in Fig. 1. Thus the false arch, while substantial and self-supporting is adapted to the transference of heat by conduction.

The exit of waste gases is at the lower rear of the recuperator, the passage 21 leading to the chimney-flue.

The interior recuperator structure is built up of the floor tile 22, the flange tile 23 and the flue tile 24.

The floor tile 22 and flange tile 23 shown in the accompanying drawings are as described and claimed in Letters Patent No. 1,587,171 granted to me on June 1, 1926, while the flue tile 24 are identical with the flue tile of said Letters Patent except for the improvement relative to the sealed joint, later to be described.

A horizontal closure formed of the floor tile 22 is supported in spaced relation with the bottom 25 of the recuperator and just below the escape passage 21, being carried on supports such as the I-beams 26 and the partition wall 27. The wall 27 extends from side wall to side wall forming an air-tight partition which is nearer the front than the rear of the recuperator, and which forms two air admission chambers 28 and 29, the front chamber 28 being the smaller. The chambers 28 and 29 are supplied with air through ports 30 and 31, respectively, and each of said ports is provided with a hinged valve or gate 32 which is further provided with a circular hole having a pivoted damper plate 33, so that the quantity of air introduced into each of the chambers may be properly regulated. To prevent the burning out of the flue tile which are adjacent to the waste gases admission from the chamber 6, I arrange by means of the separate air control for the passage of a greater volume of air through such exposed tubes. The flue tile which are not subjected to the higher temperatures may be formed of material having a higher conductivity, such as cast iron, which material I may safely employ, especially where I preliminarily reduce the temperatures of the waste gases before they enter the recuperator by superheating the preheated air.

In assembling the interior structure of the recuperator, the floor composed of the floor tile 22 is laid on the I-beams 26 and the partition 27 and at the rear and front resting on the wall-ledges $2^a$ and $3^a$, and the edges of the tile fit together as shown. The first series of flue tile 24 are then placed in position with their lower ends stepped in the bores of the floor tile resting on the internal shoulders $22^a$ of the floor tile. A series of flange tile 23 are then placed on top of the flue tile being supported by their internal shoulders $23^a$, the lateral projections $23^b$ of the flange tile abutting against each other to brace the flue tile in position. A second series of flue tile is then put in position. The next series of tile is partially floor tile 22 to form a gas-tight closure and partially flange tile 23 to form an opening between the flue tile for the downward passage of waste gases, said opening being at the front of the structure. A third series of flue tile are then placed in position and on their tops a series of flange tile. Then a fourth series of flue tile and another series of flange tile. A fifth series of flue tile are placed on top of the last mentioned flange tile. On top of the fifth series of flue tile I lay a series composed of floor tile extending from the front of the recuperator, followed by flange tile adjacent to the rear of the recuperator, thus forming a floor at the front and an opening at the rear for the downward passage of the waste gases. This series of floor tile and flange tile is substantially level with the floor of the chamber 6. A sixth series of flue tile is then laid and a series of flange tile on the same. Another or seventh series of flue tile is erected on the last mentioned flange tile and then another series of flange tile. The eighth series of flue tile is then put in place and a final series of floor tile laid thereon.

It will be understood that the tile stack of the recuperator may be built up to any desired height, it being only important that the waste gases be baffled horizontally back and forth in their travel within the walls enclosing the recuperator structure from the inlet chamber 6 to the outlet 21, substantially as indicated by the arrows in Fig. 1.

The joints between the flue tile and the flange tile or floor tile are sealed with refractory material or clay, as shown at 34. When the clay seal becomes hardened by the heat, it tends to crack and drop from position between the flue tiles and the superimposed flange tile or floor tile, and to prevent this I reduce the ends of the flue tile to form a circumferential shoulder 35 which supports the sealing clay 34 and prevents its cracking and falling out.

The partition walls between the down-flues 13 and the up-flue 14, and between the passages 15 and the passage 17 should be gas and air tight to prevent the waste gases entering the air flues and passages and vice versa. Thus in Fig. 2 I have shown the rows of partition walls formed of a plurality of refractory brick 36, the rows being on different levels so as to break the horizontal joints. In Fig. 7 I show the partition built of superimposed tile 37 tongue and grooved on their faces and ends. In Fig. 8 I show the partition built of substantially Z-shaped tile 38.

It will be noted that the recuperator is depressed below the furnace so that the flues 13 and 14 are vertical, which is the preferred arrangement.

The waste furnace gases are drawn by the chimney draft from the furnace 16 through the passages 15; the down-flues 13, through the angular passages 12, the passages 7, into the chamber 6 and thence between the piers 10 into the recuperator interior wherein they are baffled back and forth during their downward passage to the escape 21. The air is admitted through the ports 30 and 31 into the chambers 28 and 29 and thence up through the flues formed by the alined flue tile into the space above the recuperator structure below the false arch 8 and the lower end of the flue 14. The upward and rearward inclined position of the false arch direct the preheated air, without loss of velocity, up the flue 14 and into the combustion passage 17 wherein it is mingled with the fuel gas and from which it is drawn into furnace 16. The relatively thinness of the tile 20 of the false arch 8 assists in the conduction of heat from the waste gases traveling above the arch 8 to the preheated air traveling in contact with the under side of the said arch.

It will be noted that the preheated air travels on its way from the recuperator to the furnace in proximity with the waste gases traveling in the opposite direction with relatively thin refractory walls intervening, so that there is a heat transference by conduction from the waste gases to the preheated air, effecting a superheating of the latter and a consequent temperature reduction of the waste gases but with no consequent thermal loss.

A two-fold purpose is thus effected, a reduction of the waste gases temperature to prevent burning out the recuperator structure and a superheating of the preheated air which effects improved combustion.

By means of the air-control, provided by the separate bottom chambers 28 and 29 with their individual valves, I am enabled to cause a greater volume of air to pass up through the air flues nearest the inlet of the waste gases from the chamber 6, thus preventing the burning out of the flue tile which are subjected to the highest temperatures while a less volume of air is caused to travel up the flues farther from the inlet for waste gases and thus subject to less temperatures. I am thereby enabled to prevent the burning out of the flues exposed to the higher temperatures and at the same time insure the proper preheating of the air passing through the more remote flues.

By reducing the temperature of the waste gases, before they enter the recuperator structure, which reduction I accomplish without consequent thermal loss by superheating the preheated air, I am enabled to employ as a material for the flue tile, at least those not directly exposed to the waste gases as they enter the recuperator, which has greater conductive properties, such, for instance, as cast iron.

What I desire to claim is:—

1. In combination with a recuperator comprising a plurality of air-passages and means for passing the waste furnace gases between said passages, means for distributing the air passing through said passages whereby a greater volume of air is caused to travel through the passages subjected to the higher temperature.

2. In a recuperator the combination of a plurality of air-passages and means for passing the waste furnace gases between said air-passages, said air passages being grouped in relation to their nearness to the entrance of the waste furnace gases, and an individual air supply for each group.

3. In a recuperator, the combination of a plurality of vertically disposed air-flues, means for introducing the waste furnace gases at one side of the plurality of flues and for the escape of said gases at the other side of said plurality of flues, and means for proportioning the air supply for said air-flues whereby a greater volume may be caused to travel through the air-flues adjacent to the entrance of the waste furnace gases.

4. In a recuperator, the combination of a plurality of vertically disposed air-flues, means for introducing the waste furnace gases at one side of the plurality of flues and for the escape of said gases at the other side of said plurality of flues, said gases being caused to travel back and forth horizontally in the recuperator, and means for proportioning the air supply for the air-flues whereby the air-flues subjected to the hottest temperatures are supplied with an increased volume of air.

5. In a recuperator, the combination of a plurality of vertically disposed air-flues, means for introducing the furnace gases near the top and at one side of said plurality of flues and for their escape at the other side and near the bottom of said plurality of flues, and means for proportioning the air-supply to the flues whereby the flues subjected to the greatest temperatures are supplied with an increased volume of air.

6. In a recuperator, the combination of a plurality of vertically disposed air-flues, means for introducing the furnace gases near the top and at one side of said plurality of flues and for their escape at the other side and near the bottom of said plurality of flues, said gases being caused to travel back and forward horizontally between and around the flues through their passage through the recuperator, and means for proportioning the air-supply to the flues whereby the flues subjected to the greatest temperatures are supplied with an increased volume of air.

7. In combination with a vertically disposed flue tile and a horizontal tile having a recess into which the upper end of the flue tile is inserted, the joint to be sealed with clay, of means for supporting the clay packing from below to prevent the same dropping from position at the joint.

8. In combination with a vertically disposed flue tile and a horizontal tile having a recess into which the upper end of the flue tile is inserted, the joint to be sealed with clay, of means on the flue tile for supporting the clay packing from below to prevent the same dropping from position at the joint.

9. In combination with a vertically disposed flue tile and a horizontal tile having a recess into which the upper end of the flue tile is inserted, the joint being packed with clay, of a circumferential shoulder on the flue tile to maintain the packing in position.

10. In a recuperator structure, the combination with vertically disposed flue tile in spaced relation to each other, horizontally disposed tile having interengaging perimetral portions and having recesses into which the upper ends of the flue tile are inserted, the joints being packed with a refractory cementitious material, and circumferential shoulders on the flue tile to support the cement in place from below.

11. In combination with a recuperator wherein the air passes upwardly and is heated by the waste furnace gases, of a partition of refractory material superimposed on the recuperator and in contact with the under side of which the preheated air travels toward the furnace, and means for leading the waste furnace gases in contact with the upper side of the partition during their travel toward the recuperator interior.

12. In combination with a recuperator wherein the air passes upwardly and is heated by the waste furnace gases, of a partition spaced above the recuperator and in contact with the under side of which the preheated air passes from the recuperator, and means for leading the waste furnace gases in contact with the upper surface of the partition in their travel toward the recuperator interior.

Signed at Pittsburgh, Pa., this third day of May, 1926.

WILLIAM A. MORTON.